(12) United States Patent
Itoh

(10) Patent No.: US 9,081,131 B2
(45) Date of Patent: Jul. 14, 2015

(54) PROCESS FOR PRODUCING PLASTIC LENS

(75) Inventor: Shinsuke Itoh, Fukuoka (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/239,448

(22) PCT Filed: Aug. 20, 2012

(86) PCT No.: PCT/JP2012/071014
§ 371 (c)(1),
(2), (4) Date: May 23, 2014

(87) PCT Pub. No.: WO2013/027706
PCT Pub. Date: Feb. 28, 2013

(65) Prior Publication Data
US 2014/0323652 A1 Oct. 30, 2014

(30) Foreign Application Priority Data

Aug. 19, 2011 (JP) ................. 2011-179978

(51) Int. Cl.
C08K 5/16 (2006.01)
G02B 1/04 (2006.01)
C08G 18/72 (2006.01)
C08G 18/38 (2006.01)

(52) U.S. Cl.
CPC ............ *G02B 1/041* (2013.01); *C08G 18/3814* (2013.01); *C08G 18/724* (2013.01)

(58) Field of Classification Search
USPC ........................................ 524/242, 248, 721
See application file for complete search history.

(56) References Cited

U.S. PATENT DOCUMENTS

| 3,792,968 | A | 2/1974 | Rickenbacher et al. |
| 4,045,457 | A | 8/1977 | Gehrke et al. |
| 4,067,204 | A | 1/1978 | Riello |
| 2005/0014878 | A1* | 1/2005 | Schottland et al. ........... 524/242 |

FOREIGN PATENT DOCUMENTS

| JP | 38-3942 | 4/1963 |
| JP | 48-18561 | 6/1973 |
| JP | 51-65136 | 6/1976 |
| JP | 62-81601 | 4/1987 |
| JP | 9-133801 | 5/1997 |
| JP | 2000-162401 | 6/2000 |
| JP | 2002-341102 | 11/2002 |
| JP | 2003-215510 | 7/2003 |

OTHER PUBLICATIONS

International Search Report issued Nov. 13, 2012, in PCT/JP12/071014 filed Aug. 20, 2012.
Extended European Search Report dated May 20, 2015, in application No. PCT/JP2012071014.

* cited by examiner

*Primary Examiner* — Edward Cain
(74) *Attorney, Agent, or Firm* — Oblon, McClelland, Maier & Neustadt, L.L.P.

(57) ABSTRACT

The present invention is a method for producing a plastic lens, containing polymerizing a monomer composition, at least one compound selected from a compound represented by the following formula (1) and a compound represented by the following formula (2) being added in polymerization of the monomer composition:

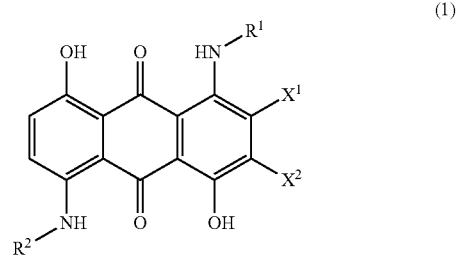

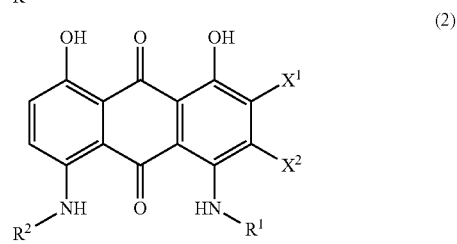

wherein in the formulae (1) and (2), one of $X^1$ and $X^2$ represents a chlorine atom, and the other thereof represents a hydrogen atom; and $R^1$ and $R^2$ each independently represent a hydrogen atom or a group selected from an alkyl group having from 1 to 8 carbon atoms.

8 Claims, No Drawings

PROCESS FOR PRODUCING PLASTIC LENS

CROSS REFERENCE TO RELATED APPLICATIONS

The present application is a 35 U.S.C. §371 national stage patent application of International patent application PCT/JP2012/071014, filed on Aug. 20, 2012, published as WO/2013/027706 on Feb. 28, 2013, the text of which is incorporated by reference, and claims the benefit of the filing date of Japanese application no. 2011-179978, filed on Aug. 19, 2011, the text of which is also incorporated by reference.

TECHNICAL FIELD

The present invention relates to a method for producing a plastic lens that is extremely close to colorless and transparent and is favorable for a spectacle lens.

BACKGROUND ART

A plastic lens formed of an optical resin excellent in transparency has been used in a wide range of fields due to the light weight and the excellent processability thereof instead of an inorganic glass lens, and is particularly useful as a spectacle lens.

A spectacle lens is demanded to have an ultraviolet ray absorbing power for protecting eyes from a harmful ultraviolet ray, and an ultraviolet ray absorbent may be added in production of a spectacle lens formed of a plastic material in some cases. However, the addition of an ultraviolet ray absorbent has caused a problem of yellowing of the plastic lens itself. The yellowing of a plastic lens may also occur in the production process thereof including a heat treatment, and various investigations have been made for preventing the yellowing of a plastic lens from occurring.

For example, it has been known that a bluing agent or a blue dye is added in the production process, but a bluing agent and a blue dye may not provide sufficient effect in some cases due to the poor solubility thereof in some kinds of monomers and the discoloration thereof during the polymerization.

PTL 1 describes a method for producing a lens including the addition of an anthraquinone compound having a particular structure as a blue dye to a urethane resin, but the production method is limited to a urethane resin, and the transparency of the resulting lens is not satisfactory in some purposes.

CITATION LIST

Patent Literature

PTL 1: Japanese Patent No. 4,067,204

SUMMARY OF INVENTION

Technical Problem

An object of the present invention is to provide a method for producing a plastic lens that is extremely close to colorless and transparent without yellowing even though the plastic lens is produced through a process including addition of an ultraviolet ray absorbent and a heat treatment, and to provide a plastic lens produced by the production method.

Solution to Problem

As a result of earnest investigations made by the present inventors, it has been found that the addition of an anthraquinone compound having a particular structure may provide a plastic lens that is extremely close to colorless and transparent without yellowing even though the plastic lens is produced through a process including addition of an ultraviolet ray absorbent and a heat treatment, and thus the present invention has been made.

The present invention relates to a method for producing a plastic lens, containing polymerizing a monomer composition, at least one compound selected from a compound represented by the following formula (1) and a compound represented by the following formula (2) being added in polymerization of the monomer composition, and also relates to a plastic lens produced by the production method.

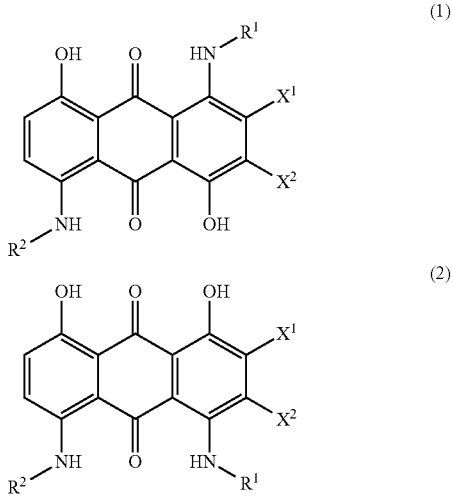

wherein in the formulae (1) and (2), one of $X^1$ and $X^2$ represents a chlorine atom, and the other thereof represents a hydrogen atom; and $R^1$ and $R^2$ each independently represent a hydrogen atom or a group selected from an alkyl group having from 1 to 8 carbon atoms.

Advantageous Effects of Invention

According to the production method of the present invention, a plastic lens may be provided that is extremely close to colorless and transparent without yellowing even though the plastic lens is produced through a process including addition of an ultraviolet ray absorbent and a heat treatment.

DESCRIPTION OF EMBODIMENTS

In the production method of a plastic lens of the present invention, at least one compound selected from a compound represented by the following formula (1) and a compound represented by the following formula (2) is added in the polymerization of the monomer composition.

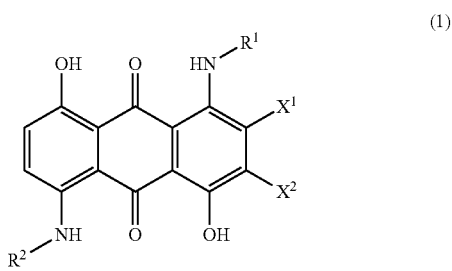

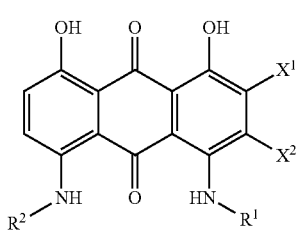

(2)

In the formulae (1) and (2), one of $X^1$ and $X^2$ represents a chlorine atom, and the other thereof represents a hydrogen atom; and $R^1$ and $R^2$ each independently represent a hydrogen atom or a group selected from an alkyl group having from 1 to 8 carbon atoms (preferably having from 1 to 3 carbon atoms).

The alkyl group having from 1 to 8 carbon atoms may be any of linear, branched and cyclic groups, and examples thereof include a methyl group, an ethyl group, a propyl group, an isopropyl group, a n-butyl group, a s-butyl group, an isobutyl group, a t-butyl group, a n-pentyl group, an isopentyl group, a n-hexyl group, an isohexyl group, a cyclopentyl group and a cyclohexyl group.

The anthraquinone compound represented by the formula (1) or (2) is preferably a compound, in which both $R^1$ and $R^2$ are hydrogen atoms, from the standpoint of the availability of the compound. The anthraquinone compounds represented by the formulae (1) and (2) are structural isomers with respect to each other, and the addition of any one of them may exhibit the advantageous effects of the present invention, but the compound represented by the formula (1) is preferred from the standpoint of the effect of preventing the yellowing.

In the production method of the present invention, the amount of the anthraquinone compound represented by the formula (1) or (2) added may be appropriately determined depending on the kind of the monomer used as a raw material of the plastic lens and the kind of the additive that is added depending on necessity, and is generally preferably from 0.001 to 1,000 ppm by mass, more preferably from 0.01 to 100 ppm by mass, and further preferably from 0.1 to 10 ppm by mass, based on the total amount of the monomer composition. When the amount thereof added is 0.001 ppm by mass or more, the effect of preventing yellowing of the plastic lens may be exhibited, and when the amount is 1,000 ppm by mass or less, the plastic lens may have sufficient transparency.

In the case where two or more kinds of the anthraquinone compounds are added, the addition amount shown above means the total amount of the compounds.

In the production method of the present invention, the plastic material applied to the plastic lens is not particularly limited and may be one that is ordinarily used as a resin lens, and examples thereof include a urethane resin, a thiourethane resin, a polycarbonate resin, a polystyrene resin, a polyacrylate resin and a melamine resin. In the case where the plastic lens is used as a spectacle lens, a urethane resin and a thiourethane resin are preferably used in a spectacle lens since they are excellent in transparency and impact resistance among the aforementioned resins.

In the present invention, for example, in the case where a urethane resin or a thiourethane resin is used as the plastic material, monomers, such as a polyisocyanate compound, a polythiol compound and a polyol compound, may be used, and depending on necessity, additives, such as an ultraviolet ray absorbent, a polymerization catalyst and a mold releasing agent, may also be used as raw materials of the resin. As the raw material monomer, the use of at least an aromatic polyisocyanate compound is preferred.

Examples of the monomers and the additives include the following compounds.

As the polyisocyanate compound, an aromatic polyisocyanate compound, an aliphatic or alicyclic polyisocyanate compound and the like may be used.

Examples of the aromatic polyisocyanate compound include 1,3-phenylene diisocyanate, 1,4-phenylene diisocyanate, 2,4-tolylene diisocyanate, 2,6-tolylene diisocyanate, o-xylylene diisocyanate, m-xylylene diisocyanate, p-xylylene diisocyanate, α,α,α',α'-tetramethylxylylene diisocyanate, 4,4'-diphenylmethane diisocyanate, ethylphenylene diisocyanate, dimethylphenylene diisocyanate, diethylphenylene diisocyanate, isopropylphenylene diisocyanate, diisopropylphenylene diisocyanate, trimethylbenzene triisocyanate and benzene triisocyanate. The aromatic polyisocyanate compounds may be used solely or as a combination of two or more kinds thereof. Among the above compounds, 4,4'-diphenylmethane diisocyanate, 2,4-tolylene diisocyanate and 2,6-tolylene diisocyanate are preferably used since these compounds are easily available industrially.

Examples of the aliphatic polyisocyanate compound include 1,6-hexamethylene diisocyanate, lysine ester triisocyanate, methylene triisocyanate and 1,3,6-hexamethylene triisocyanate, and examples of the alicyclic polyisocyanate compound include isophorone diisocyanate, dicyclohexylmethane diisocyanate, 1,3-cyclohexane diisocyanate, 1,4-cyclohexane diisocyanate, 1,2-bis(isocyanatomethyl)cyclohexane, 1,3-bis(isocyanatomethyl)cyclohexane, 1,4-bis(isocyanatomethyl)cyclohexane, 2,5-bis(isocyanatomethyl)bicyclo[2,2,1]heptane, 2,6-bis(isocyanatomethyl)bicyclo[2,2,1]heptane, 1,3,5-tris(isocyanatomethyl)cyclohexane and bicycloheptane triisocyanate. The aliphatic and alicyclic polyisocyanate compounds may be used solely or as a mixture of two or more kinds thereof.

Examples of the polythiol compound include ethylene glycol bis(2-mercaptoacetate), trimethylolpropane bis(2-mercaptoacetate), pentaerythritol tetrakis(3-mercaptopropionate), trimethylolpropane bis(2-mercaptopropionate), trimethylolpropane bis(3-mercaptopropionate), pentaerythritol tetrakis(2-mercaptoacetate), pentaerythritol tetrakis(3-mercaptoacetate), dipentaerythritol hexakis(mercaptoacetate), 2,5-bis(mercaptomethyl)-1,4-dithiane, bis((2-mercaptoethyl)thio)-3-mercaptopropane, 4,7-bis(mercaptomethyl)-3,6,9-trithiaundecane-1,11-dithiol, 4,8-bis(mercaptomethyl)-3,6,9-trithiaundecane-1,11-dithiol and 5,7-bis(mercaptomethyl)-3,6,9-trithiaundecane-1,11-dithiol. The polythiol compounds may be used solely or as a mixture of two or more kinds thereof.

As the polyol compound, an aliphatic or aromatic polyol compound and the like may be used.

Examples of the aliphatic polyol compound include ethylene glycol, diethylene glycol, propylene glycol, dipropylene glycol, butylene glycol, neopentyl glycol, glycerin, trimethylolethane, trimethylolpropane, butanetriol, 1,2-methylglucoside, pentaerythritol, dipentaerythritol, tripentaerythritol, triethylene glycol, polyethylene glycol, tris(2-hydroxyethyl)isocyanurate, cyclobutanediol, cyclopentanediol, cyclohexanediol, cycloheptanediol, cyclooctanediol, bicyclo[4.3.0]nonanediol, dicyclohexanediol, tricyclo[5.3.1.1]dodecanediol, spiro[3.4]octanediol and butylcyclohexanediol.

Examples of the aromatic polyol compound include dihydroxynaphthalene, trihydroxynaphthalene, tetrahydroxynaphthalene, dihydroxybenzene, benzenetriol, trihydroxyphenanthrene, bisphenol A, bisphenol F, xylylene glycol and tetrabromobisphenol.

The aliphatic and alicyclic polyol compounds may be used solely or as a mixture of two or more kinds thereof.

As the additive that may be added depending on necessity, an ultraviolet ray absorbent, a polymerization catalyst, a mold releasing agent and the like may be used.

In the case where an ultraviolet ray absorbent is added in the production method of the present invention, in particular, the addition of the anthraquinone compound represented by the formula (1) or (2) may exhibit conspicuously the advantageous effects of the present invention.

Examples of the ultraviolet ray absorbent include a benzophenone compound, such as 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-benzyloxybenzophenone and 2,2'-dihydroxy-4-methoxybenzophenone; a benzotriazole compound, such as 2-(2'-hydroxy-5'-methylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-3',5'-di-t-amylphenyl)benzotriazole, 2-(2'-hydroxy-3',5'-di-t-butylphenyl)benzotriazole, 2-(2'-hydroxy-5'-t-butylphenyl)benzotriazole, 2-(2'-hydroxy-5'-t-octylphenyl)benzotriazole and 2-(2-hydroxy-4-octyloxyphenyl)benzotriazole; dibenzoylmethane, and 4-tert-butyl-4'-methoxybenzoylmethane. The ultraviolet ray absorbents may be used solely or as a mixture of two or more kinds thereof.

The polymerization catalyst may be used preferably in the case where the reaction rate of polymerization of the monomers is controlled, and examples thereof include an organic tin compound, such as dibutyl tin diacetate, dibutyl tin dilaurate, dibutyl tin dichloride, dimethyl tin dichloride, monomethyl tin trichloride, trimethyl tin chloride, tributyl tin chloride, tributyl tin fluoride and dimethyl tin dibromide. The polymerization catalysts may be used solely or as a mixture of two or more kinds thereof.

Examples of the mold releasing agent include a phosphate monoester compound, such as isopropyl acid phosphate, butyl acid phosphate, octyl acid phosphate, nonyl acid phosphate, decyl acid phosphate, isodecyl acid phosphate, tridecyl acid phosphate, stearyl acid phosphate, propylphenyl acid phosphate and butylphenyl acid phosphate; and a phosphate diester compound, such as diisopropyl acid phosphate, dibutyl acid phosphate, dioctyl acid phosphate, diisodecyl acid phosphate, bis(tridecyl acid phosphate), distearyl acid phosphate, dipropylphenyl acid phosphate, dibutylphenyl acid phosphate and butoxyethyl acid phosphate. The mold releasing agents may be used solely or as a mixture of two or more kinds thereof.

The polymerization in the production method of the present invention is preferably performed in such a manner that the anthraquinone compound represented by the formula (1) or (2) is added to the monomer composition, to which the additive may be added depending on necessity, and then the mixture is usually subjected to mold casting polymerization.

In the mold casting polymerization, for example, the mixture is cast in a mold containing a combination of a glass or metal mold and a resin gasket, and polymerized under heating. The polymerization temperature and the polymerization time may vary depending on the kinds of the raw materials, and are generally from 0 to 150° C. and from 0.5 to 72 hours, respectively.

EXAMPLE

The present invention will be described in more detail with reference to examples, but the present invention is not limited to the examples.

In Examples and Comparative Examples, the yellowing degree (YI value) of the resulting lens was measured according to the test method for yellowness degree and yellowing degree of plastics defined in JIS K7103-1977.

Example 1

22.88 g of 4,4'-diphenylmethane diisocyanate and 25.09 g of 1,6-hexamethylene diisocyanate were charged in a 500-mL recovery flask, to which 0.05 g of JP-513 (produced by Johoku Chemical Co., Ltd.) as a mold releasing agent, 0.03 g of dimethyl tin dichloride as a polymerization catalyst, 1.00 g of Seesorb 701 (produced by Shipro Kasei Kaisha, Ltd.) as an ultraviolet ray absorbent and 0.8 ppm by mass of 1,5-diamino-2-chloro-4,8-dihydroxy-9,10-anthracendione as the compound represented by the formula (1) were added, and the mixture was stirred at 50° C. under purging with nitrogen for 30 minutes. After the components were completely dissolved, 52.03 g of pentaerythritol tetrakis(2-mercaptoacetate) was mixed therewith, and the mixture was stirred under reduced pressure of 1.3 kPa for 20 minutes to prepare a mixture.

The mixture was cast in a lens mold having a center thickness of 2 mm through a 1.0-μm PTFE membrane filter and polymerized under a temperature program with the initial temperature of 30° C. to the final temperature of 120° C. over 24 hours, thereby producing a lens.

The resulting lens was colorless and transparent with substantially no yellowness, and had a YI value of 1.53.

Example 2

A lens was obtained in the same procedures as in Example 1 except that 4,4'-diphenylmethane diisocyanate was replaced by tolylene diisocyanate.

The resulting lens was colorless and transparent with substantially no yellowness, and had a YI value of 1.60.

Comparative Example 1

A lens was obtained in the same procedures as in Example 1 except that the compound represented by the formula (1) was replaced by a compound represented by the following formula (3).

The resulting lens was considerably yellowed and had a YI value of 7.81.

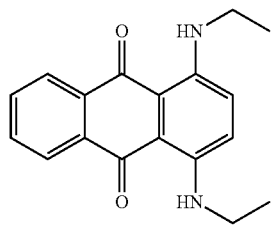

(3)

Comparative Example 2

A lens was obtained in the same procedures as in Example 1 except that the compound represented by the formula (1) was replaced by a compound represented by the following formula (4).

The resulting lens was considerably yellowed and had a YI value of 8.03.

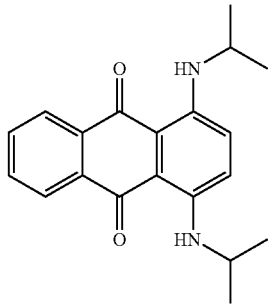

(4)

Comparative Example 3

A lens was obtained in the same procedures as in Example 1 except that the compound represented by the formula (1) was replaced by a compound represented by the following formula (5).

The resulting lens was considerably yellowed and had a YI value of 7.50.

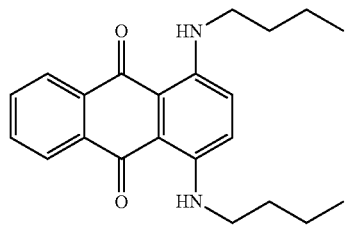

(5)

INDUSTRIAL APPLICABILITY

The method for producing a plastic lens of the present invention, in which an anthraquinone compound having a particular structure is added, may provide a plastic lens that is extremely close to colorless and transparent without yellowing even though the plastic lens is produced through a process including addition of an ultraviolet ray absorbent and a heat treatment. Accordingly, it is favorable as a method for producing a lens for a purpose that requires these properties, particularly a spectacle lens.

The invention claimed is:

1. A method for producing a plastic lens, the method comprising:
   polymerizing a monomer composition, and
   adding, during the polymerizing of the monomer composition, at least one compound selected from the group consisting of a compound represented formula (1) and a compound represented by formula (2):

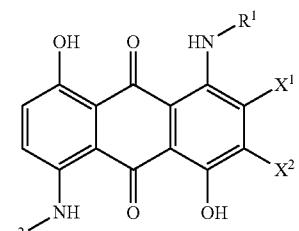

(1)

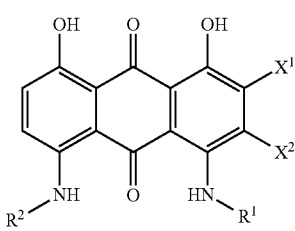

(2)

wherein in each of the formulae (1) and (2), one of $X^1$ and $X^2$ represents a chlorine atom, and the other thereof represents a hydrogen atom; and $R^1$ and $R^2$ each independently represent a hydrogen atom or an alkyl group having from 1 to 8 carbon atoms.

2. The method of claim 1, wherein from 0.001 to 1,000 ppm by mass of the at least one compound selected from the group consisting of the compound represented by the formula (1) and the compound represented by the formula (2) is added.

3. The method of claim 1, wherein the plastic lens is a urethane plastic lens or a thiourethane plastic lens.

4. The method of claim 1, wherein the monomer composition comprises an aromatic polyisocyanate compound.

5. A plastic lens obtained by the method of claim 1.

6. The method of claim 1, wherein the compound represented by formula (1) is added to the monomer composition during the polymerizing.

7. The method of claim 1, wherein the compound represented by formula (2) is added to the monomer composition during the polymerizing.

8. The method of claim 1, wherein both the compound represented by formula (1) and the compound represented by formula (2) are added to the monomer composition during the polymerizing.

* * * * *